No. 623,077. Patented Apr. 11, 1899.
J. W. DE WALT.
BAKE PAN.
(Application filed Jan. 18, 1899.)
(No Model.)
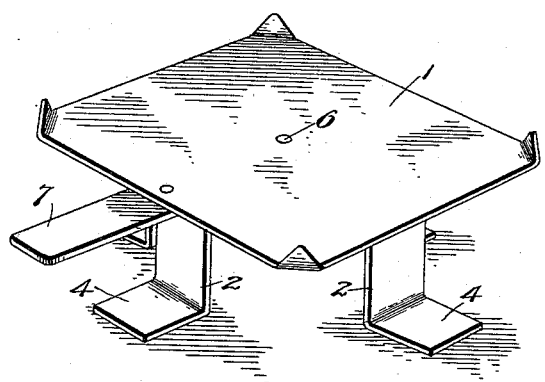
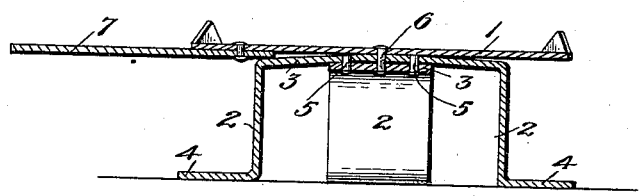

UNITED STATES PATENT OFFICE.

JOHN W. DE WALT, OF TIONESTA, PENNSYLVANIA.

BAKE-PAN.

SPECIFICATION forming part of Letters Patent No. 623,077, dated April 11, 1899.

Application filed January 18, 1899. Serial No. 702,549. (No model.)

*To all whom it may concern:*

Be it known that I, JOHN W. DE WALT, a citizen of the United States, residing at Tionesta, in the county of Forest and State of Pennsylvania, have invented certain new and useful Improvements in Bake-Pans; and I do declare the following to be a full, clear, and exact description of the invention, such as will enable others skilled in the art to which it appertains to make and use the same.

The invention has relation to bake-pans, and more particularly to pans for baking cookies.

The object of the invention is to provide a pan for this purpose by means of which the cookies may be thoroughly and evenly baked both on the top and bottom, as well as on the sides, provision being made whereby the pan, with its cookies, may be turned to different points in the oven to bring certain parts of the cookies in the warmest place in the oven.

With this object in view the invention consists in certain features of construction and combinations of parts, as will be hereinafter fully described and claimed.

In the drawings, Figure 1 is a perspective view of my improved cooky-pan. Fig. 2 is a longitudinal sectional view.

In the drawings, 1 denotes the body of the pan, which may be of any suitable size or shape.

2 denotes the legs or supports, each of which consists of the arched portion 3, having feet 4. The arched portions are secured together by rivets 5 and are pivoted to the center of the body of the pan by a pivot 6, so that the pan may be rotated to change the location of the cookies, whereby they may be uniformly baked. In order to accomplish this, I provide a handle 7, which is pivoted to the body of the pan and which when not in use may be folded underneath the body portion, between its lower side and the upper faces of the arched portions of the legs, out of the way.

From the foregoing description, taken in connection with the accompanying drawings, the construction, operation, and advantages of the invention will be readily understood without requiring an extended explanation.

By supporting the pan free from the bottom of the oven I provide for a free circulation of air underneath the pan, so that the cooky or article being baked will be uniformly cooked both on the top and bottom, and should one part of the oven be hotter than the other the body of the pan may be swung around, so that all portions of the cooky will be evenly browned.

Having thus described the invention, what is claimed, and desired to be secured by Letters Patent, is—

A bake-pan consisting of a body portion, in combination with supporting-legs consisting of arched portions crossing each other and riveted together, and provided at their ends with laterally-projecting feet, a pivot for connecting the arched portions of the legs to the body of the pan, and a handle pivoted to the under side of the pan and adapted, when not in use, to be swung in under the lower face of the pivoted portion of the pan and the upper faces of the arched portions of the legs, substantially as and for the purpose set forth.

In testimony whereof I have hereunto set my hand in presence of two subscribing witnesses.

JOHN W. DE WALT.

Witnesses:
W. H. ELLIS,
C. M. ARNER.